(12) United States Patent
Jussila et al.

(10) Patent No.: US 9,172,311 B2
(45) Date of Patent: Oct. 27, 2015

(54) SWITCHING ARRANGEMENT FOR INVERTER, AND INVERTER

(71) Applicant: ABB Oy, Helsinki (FI)

(72) Inventors: Matti T. Jussila, Vantaa (FI); Jarno Juhani Alahuhtala, Espoo (FI); Ville Koivula, Helsinki (FI)

(73) Assignee: ABB OY, Helsinki (FI)

( * ) Notice: Subject to any disclaimer, the term of this patent is extended or adjusted under 35 U.S.C. 154(b) by 0 days.

(21) Appl. No.: 14/271,891

(22) Filed: May 7, 2014

(65) Prior Publication Data
US 2014/0334213 A1 Nov. 13, 2014

(30) Foreign Application Priority Data

May 8, 2013 (EP) .................................... 13166951

(51) Int. Cl.
*H02M 7/5387* (2007.01)
*H02M 7/487* (2007.01)
*H02M 1/12* (2006.01)
*H02M 7/483* (2007.01)
*H02J 3/38* (2006.01)

(52) U.S. Cl.
CPC .............. *H02M 7/487* (2013.01); *H02M 1/126* (2013.01); *H02M 7/483* (2013.01); *H02J 3/383* (2013.01); *H02M 2001/123* (2013.01); *Y02E 10/563* (2013.01)

(58) Field of Classification Search
USPC ............ 363/34, 35, 36, 37, 40, 41, 55, 56.01, 363/56.02, 98, 123, 131, 132
See application file for complete search history.

(56) References Cited

U.S. PATENT DOCUMENTS

| | | | |
|---|---|---|---|
| 8,897,040 B2 * | 11/2014 | Holliday et al. | 363/37 |
| 2009/0244936 A1 | 10/2009 | Falk et al. | |
| 2012/0068655 A1 | 3/2012 | Inuduka et al. | |
| 2012/0249038 A1 * | 10/2012 | Wei et al. | 318/490 |
| 2013/0099571 A1 | 4/2013 | Bremicker et al. | |
| 2013/0229837 A1 * | 9/2013 | Wang et al. | 363/40 |
| 2013/0329471 A1 * | 12/2013 | Escobar et al. | 363/40 |

FOREIGN PATENT DOCUMENTS

| | | |
|---|---|---|
| DE | 10 2008 063 201 A1 | 7/2010 |
| DE | 10 2010 009265 A1 | 8/2011 |
| DE | 10 2012 020036 A1 | 4/2013 |
| EP | 2 107 672 A1 | 10/2009 |
| EP | 2 375 552 A1 | 10/2011 |

OTHER PUBLICATIONS

Edelmoser, K. H., "Common Mode Problematic of Solar Inverter Systems", Proceedings of the 11th WSEAS International Conference on Circuits, pp. 131-135 (Jul. 23-25, 2007).
Bruckner, T. et al., "The Active NPC Converter and Its Loss-Balancing Control", IEEE Transactions on Industrial Electronics, vol. 52, No. 3, pp. 855-868 (Jun. 2005).
Extended European Search Report dated Sep. 13, 2013, issued by the European Patent Office in corresponding European Patent Application No. 13 16 6951. (3 pages).

* cited by examiner

*Primary Examiner* — Nguyen Tran
(74) *Attorney, Agent, or Firm* — Buchanan Ingersoll & Rooney PC (57) ABSTRACT

Exemplary embodiments are directed to a method and switching arrangement for an inverter. The inverter including a positive direct current pole, a negative direct current pole, and a neutral direct current pole. The arrangement having a first controllable switch connected between the neutral direct current pole of the inverter and a virtual neutral point of an alternating current network supplied by the inverter; and/or a second controllable switch connected between the neutral direct current pole of the inverter and an earth potential of an alternating current network supplied by the inverter.

7 Claims, 6 Drawing Sheets

SWITCHING ARRANGEMENT FOR INVERTER, AND INVERTER

RELATED APPLICATION(S)

This application claims priority under 35 U.S.C. §119 to European application 13166951.7 filed on May 8, 2013. The content of which is hereby incorporated by reference in its entirety.

FIELD

The disclosure relates to a switching arrangement for an inverter, an inverter, and a method for controlling an inverter.

BACKGROUND INFORMATION

Known converters, such as inverters or rectifiers, can have three DC poles. In addition to positive and negative DC poles, they have a neutral DC pole. For example, three-level converters have three DC poles. Examples of three-level converters are given in T. Brückner, S. Bernet and H. Güldner, "The Active NPC Converter and Its Loss-Balancing Control", IEEE Transactions on Industrial Electronics, Vol. 52, No. 3, June 2005. For example, examples of three-level neutral-point-clamped (NPC) converters are given.

Figure 1:
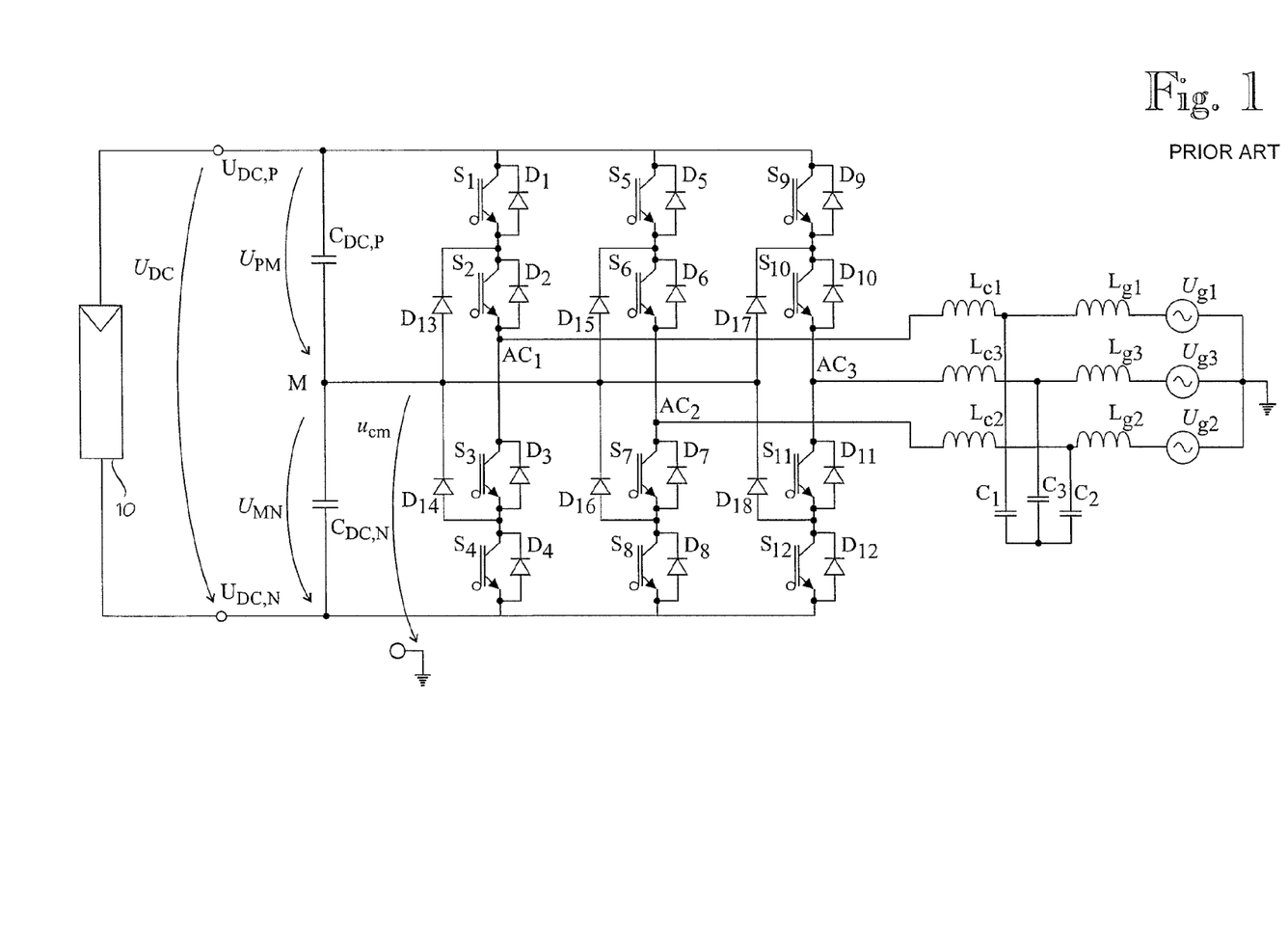
FIG. 1 shows a circuit diagram of a first three-phase three-level inverter according to a known implementation.

FIG. 1 shows a circuit diagram of a first three-phase three-level inverter according to a known implementation. The inverter can be supplied by one or more photovoltaic panels 10 connected between its positive and negative direct current poles $U_{DC,P}$, $U_{DC,N}$ as illustrated. The inverter further supplies a three phase power system connected to its alternating current poles $AC_1$, $AC_2$, $AC_3$.

A possible problem related to the use of three-level inverters is that in normal operation a high-frequency voltage is formed between the DC circuit and earth, e.g., a common-mode voltage $u_{cm}$ includes a high-frequency component. This high-frequency component can stress, e.g. in case of photovoltaic applications, insulations of the photovoltaic panels and further cause harmful high-frequency currents in the vicinity of support structures of the photovoltaic panels. The following equation applies to the system of FIG. 1:

$$U_{DC} > U_g\sqrt{6} + U_{margin} \quad (1)$$

where
$U_g$=phase voltage of the three phase power system supplied by the inverter; and
$U_{margin}$=voltage value depending on the system control and component values.

Figure 2:
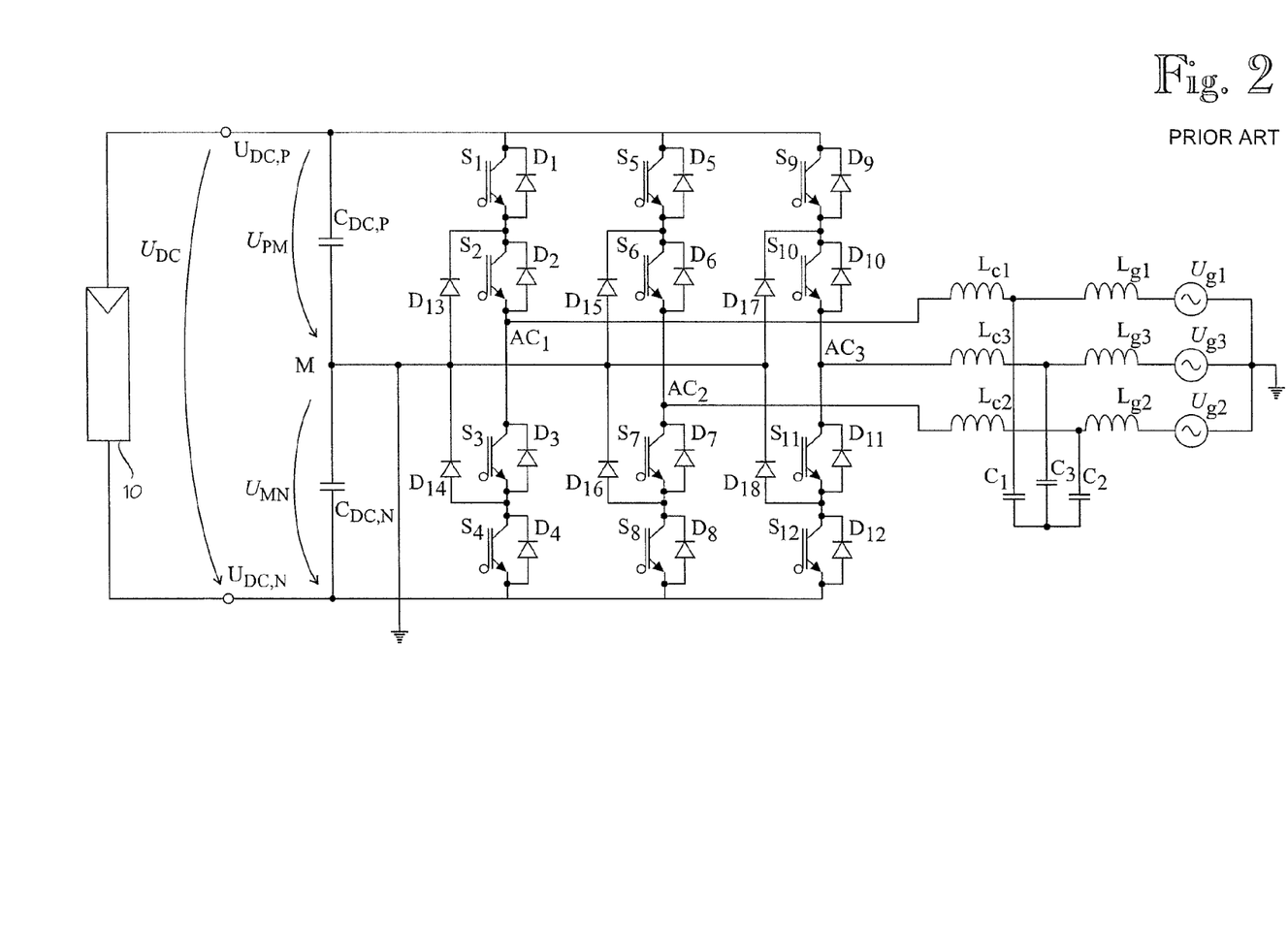
FIG. 2 shows a circuit diagram of a second three-phase three-level inverter according to a known implementation.

FIG. 2 shows a circuit diagram of a second three-phase three-level inverter according to a known implementation. The formation of the common-mode voltage $u_{cm}$ can be prevented by earthing the neutral direct current pole M of the inverter DC circuit as illustrated in FIG. 2. This solution eliminates the common-mode voltage $u_{cm}$ completely and thus also the voltages of the positive and negative direct current poles $U_{DC,P}$, $U_{DC,N}$ against earth are pure DC voltages, in this case $U_{PM}$ and $U_{MN}$ respectively. A possible problem related to this solution is that the voltage $U_{DC}$ of the DC circuit should be considerably higher. The following equation applies to the system of FIG. 2:

$$U_{DC} > U_g\sqrt{8} + U_{margin} \quad (2)$$

Figure 3:
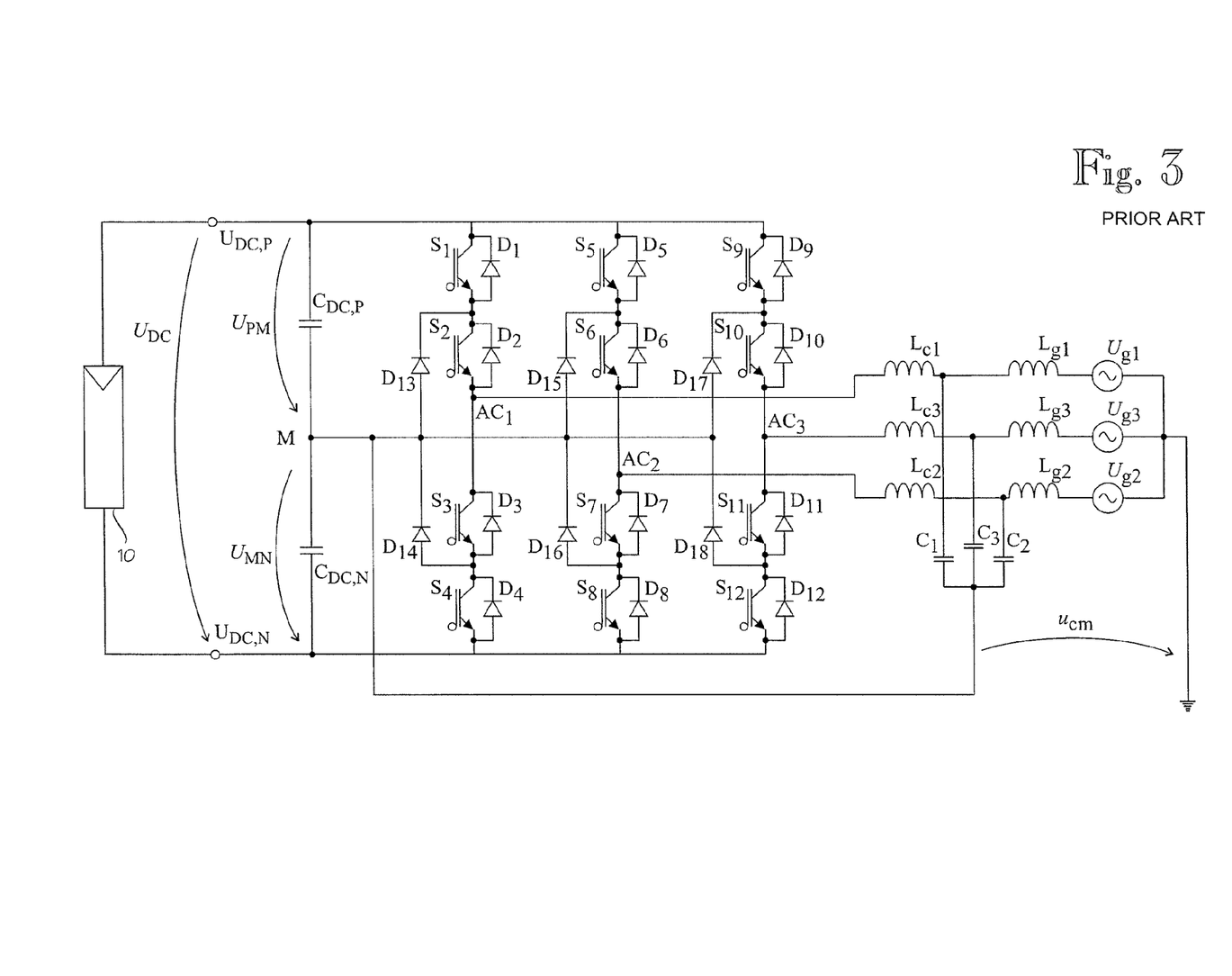
FIG. 3 shows a circuit diagram of a third three-phase three-level inverter according to a known implementation.

FIG. 3 shows a circuit diagram of a third three-phase three-level inverter according to a known implementation. Because in known implementations only the high-frequency components of the common-mode voltage $u_{cm}$ cause problems, these problems can be resolved by removing the high-frequency components. This can be accomplished by connecting the neutral direct current pole M of the inverter DC circuit to a virtual neutral point of the power system supplied by the inverter. The virtual neutral point of a three phase power system generally refers to a star point of three star-connected impedances in the three-phase power system. An example of such a virtual neutral point is the star point of star-connected capacitors of an AC output filter of the inverter as shown in FIG. 3. This procedure is also called virtual earthing. The virtual earthing makes the operation possible with a lower voltage $U_{DC}$ of the DC circuit than in the case of an earthed system (as in FIG. 2). However, a possible problem with this solution, when compared with the system of FIG. 1, is that the current stress of the semiconductor switches can be greater and the operation can call for a higher voltage $U_{DC}$ of the DC circuit. The following equation applies to the system of FIG. 3:

$$U_{DC} > U_g\sqrt{6} + U_{margin} + U_{add} \quad (3)$$

where
$U_{add}$=additional voltage depending on the system control and modulation methods and component values.

In practice $U_{add}$ can be about 20 to 50 V, which is 5 to 12% if a desirable voltage variation of a maximum power point tracking of the inverter is 400 V. This 5 to 12% in the DC voltage range can be a significant amount when possible operating environments of the system are evaluated.

SUMMARY

A switching arrangement for an inverter is disclosed, the inverter including a positive direct current pole, a negative direct current pole, and a neutral direct current pole, the arrangement comprising: at least one of: a) a first controllable switch connected between the neutral direct current pole of the inverter and a virtual neutral point of an alternating current network supplied by the inverter; and b) a second controllable switch connected between the neutral direct current pole of the inverter and an earth potential of an alternating current network supplied by the inverter.

A method for controlling an inverter is disclosed the inverter including a positive direct current pole, a negative direct current pole, and a neutral direct current pole, wherein the inverter comprises at least one of a) a first controllable switch connected between the neutral direct current pole of the inverter and a virtual neutral point of an alternating current network supplied by the inverter, and b) a second controllable switch connected between the neutral direct current pole of the inverter and an earth potential of an alternating current network supplied by the inverter, the method comprising: at least one of: controlling the first controllable switch according to one or more predetermined parameters; and controlling the second controllable switch according to one or more predetermined parameters.

BRIEF DESCRIPTION OF THE DRAWINGS

The disclosure will now be explained in greater detail in connection with exemplary embodiments and with reference to the attached drawings, in which.

DETAILED DESCRIPTION

Exemplary embodiments of the present disclosure provide a method and an apparatus to solve or at least alleviate the above problems. The exemplary embodiments described herein include a switching arrangement, an inverter, a method, and a computer program product that includes of what is stated in the independent claims. Exemplary embodiments of the disclosure are described in the dependent claims.

Exemplary embodiments of the present disclosure provide a controllable switch connected between the neutral direct current pole of the inverter and the virtual neutral point of the alternating current network supplied by the inverter. Other exemplary embodiments of the disclosure provide a controllable switch connected between the neutral direct current pole of the inverter and the earth potential of an alternating current network supplied by the inverter.

The exemplary embodiments described herein provide the advantage that the neutral direct current pole of the inverter can be connected to or disconnected from the virtual neutral point of the alternating current network supplied by the inverter and/or the earth potential of an alternating current network supplied by the inverter, depending on what the most optimal mode of operation in the operating point and application in question is. The exemplary embodiments enable the maximization of energy production and, generally, optimization of efficiency of inverter applications.

The exemplary embodiments of the present disclosure are not restricted to any specific system, but can be applied to various electric systems. In addition, the exemplary embodiments described herein are not limited to systems utilizing a specific basic frequency or to a specific voltage level. While the following examples relate to three-phase three-level inverters, the exemplary embodiments described herein can be applied to any inverter, such as a two-level inverter, that has three DC poles, namely a positive direct current pole, a negative direct current pole, and a neutral direct current pole. In addition, the exemplary embodiments of the present disclosure can also be applied to two-phase inverters or inverters having more than three phases, for example.

Figure 4:
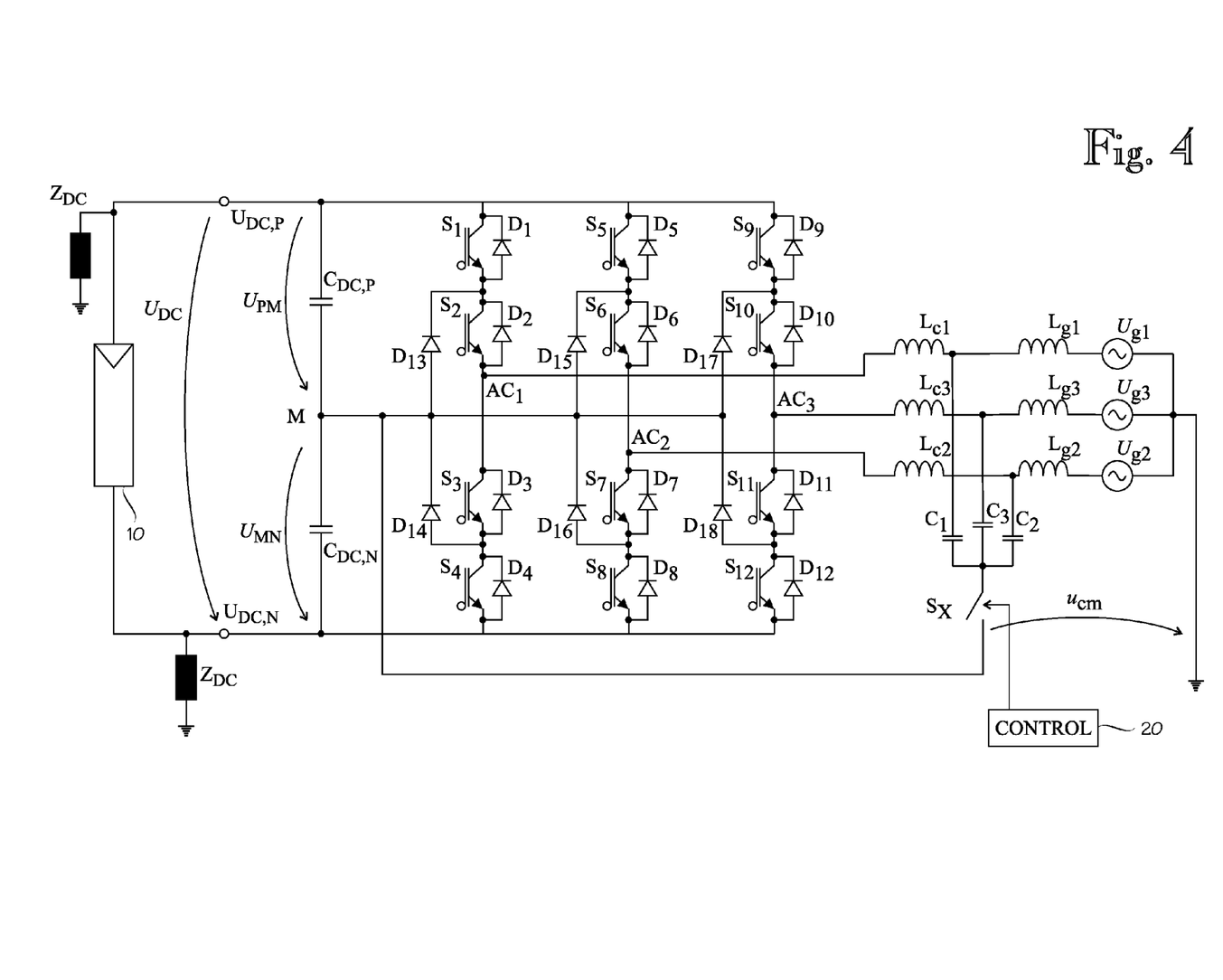
FIG. 4 shows a circuit diagram of a fourth three-phase three-level inverter according to an exemplary embodiment of the present disclosure.

FIG. 4 shows a circuit diagram of a fourth three-phase three-level inverter according to an exemplary embodiment of the present disclosure. It should be noted that the Figures provided may present those elements essential to the understanding of the disclosure. As shown in FIG. 4, the three-phase three-level inverter includes a positive direct current pole $U_{DC,P}$, a negative direct current pole $U_{DC,N}$, a neutral direct current pole M, and three switching branches, each switching branch including four controllable semiconductor switches connected in series between the positive direct current pole and the negative direct current pole. More specifically, each switching branch of the three-phase three-level inverter includes an alternating current pole $AC_1$, $AC_2$, $AC_3$ and a first controllable semiconductor switch $S_1$, $S_5$, $S_9$ and a second controllable semiconductor switch $S_2$, $S_6$, $S_{10}$ connected in series between the positive direct current pole $U_{DC,P}$ and the alternating current pole $AC_1$, $AC_2$, $AC_3$ of the switching branch, wherein the first controllable semiconductor switch $S_1$, $S_5$, $S_9$ is connected to the positive direct current pole $U_{DC,P}$.

A first diode $D_1$, $D_5$, $D_9$ can be connected in parallel to the first controllable semiconductor switch $S_1$, $S_5$, $S_9$ and a second diode $D_2$, $D_6$, $D_{10}$ can be connected in parallel to the second controllable semiconductor switch $S_2$, $S_6$, $S_{10}$. Further, each switching branch includes a third controllable semiconductor switch $S_3$, $S_7$, $S_{11}$ and a fourth controllable semiconductor switch $S_4$, $S_8$, $S_{12}$ connected in series between the negative direct current pole $U_{DC,N}$ and the alternating current pole $AC_1$, $AC_2$, $AC_3$ of the switching branch, wherein the fourth controllable semiconductor switch $S_4$, $S_8$, $S_{12}$ is connected to the negative direct current pole $U_{DC,N}$. A third diode $D_3$, $D_7$, $D_{11}$ can be connected in parallel to the third controllable semiconductor switch $S_3$, $S_7$, $S_{11}$, and a fourth diode $D_4$, $D_8$, $D_{12}$ can be connected in parallel to the fourth controllable semiconductor switch $S_4$, $S_8$, $S_{12}$. Further, each switching branch includes a fifth diode $D_{13}$, $D_{15}$, $D_{17}$ connected between the neutral direct current pole M and a connection point between the first controllable semiconductor switch $S_1$, $S_5$, $S_9$ and the second controllable semiconductor switch $S_2$, $S_6$, $S_{10}$, and a sixth diode $D_{14}$, $D_{16}$, $D_{18}$ connected between the neutral direct current pole M and a connection point between the third controllable semiconductor switch $S_3$, $S_7$, $S_{11}$ and the fourth controllable semiconductor switch $S_4$, $S_8$, $S_{12}$.

The controllable semiconductor switches can be IGBTs (Insulated Gate Bipolar Transistor) or FETs (Field-Effect Transistor) or any corresponding controllable semiconductor switches. For the sake of clarity, FIG. 4 does not show any control connections via which the controllable semiconductor switches $S_1$ to $S_{12}$ can be controlled. The control of the semiconductor switches $S_1$ to $S_{12}$ can involve one or more control components (not shown). While the inverter of the example of FIG. 4 is a neutral-point-clamped inverter, the inverter could be an active neutral-point-clamped inverter, for example, or another type of three-level inverter.

FIG. 4 further shows an example of a DC intermediate circuit of the exemplary inverter, which DC intermediate circuit can comprise capacitors $C_{DC,P}$ and $C_{DC,N}$ as illustrated. The structure of the intermediate circuit could also be different, depending on the circuit configuration used. The exemplary inverter of FIG. 4 can be supplied by one or more photovoltaic panels 10 connected between its positive and negative direct current poles $U_{DC,P}$, $U_{DC,N}$ as illustrated in the example. The inverter can also be supplied from another kind of source. The exemplary inverter of FIG. 4 can supply a three-phase alternating current network through its alternating current poles $AC_1$, $AC_2$, $AC_3$. There can be an output filter connected to the alternating current poles $AC_1$, $AC_2$, $AC_3$ of the inverter. The output filter can be an LC or LCL type of filter, for example. FIG. 4 illustrates an LC type output filter with three inductances $L_{c1}$, $L_{c2}$, $L_{c3}$ and three star-connected capacitances $C_1$, $C_2$, $C_3$. The rest of the three-phase alternating current network is shown in FIG. 4 in a simplified manner, with three inductances $L_{g1}$, $L_{g2}$, $L_{g3}$ and three phase voltages $U_{g1}$, $U_{g2}$, $U_{g3}$.

According to an exemplary embodiment of the present disclosure, FIG. 4 illustrates a controllable switch $S_X$ connected between the neutral direct current pole M of the inverter and a virtual neutral point of an alternating current network supplied by the inverter. An example of such a virtual neutral point in a three-phase system is the star point of the star-connected capacitors of the AC output filter of the inverter as shown in the example of FIG. 4. However, the virtual neutral point of the three-phase alternating current network supplied by the inverter generally refers to any star point of three star-connected impedances, such as capacitors or resistors or a combination thereof, in the three-phase alternating current network supplied by the inverter. In a two-phase system, such a virtual neutral point can be a connection point of two impedances, such as capacitors or resistors or a combination thereof, connected in series between the phases. The controllable switch $S_X$ can be part of the inverter or part of a separate switching arrangement, for example. The controllable switch $S_X$ can be an electromechanical switch, such as a relay or a contactor, or a semiconductor switch, for example. The controllable switch $S_X$ can also be a manually controllable mechanical switch.

According to an exemplary embodiment, the switch $S_X$ is controlled according to one or more predetermined parameters. This can be performed manually by an operator of the inverter system. Such a manual control of the switch $S_X$ can take place at any time. The switch $S_X$ can be set at the start-up of the inverter system or later according to the one or more predetermined parameters, such as system conditions, and the setting can be changed if necessary. The control of the switch $S_X$ can also be performed automatically. For this, a control arrangement 20 can be provided which is configured to control the switch $S_X$ according to the one or more predetermined parameters. Also the control arrangement 20 or a corresponding entity can be part of the inverter or part of a separate switching arrangement, for example. According to an embodiment, the one or more predetermined parameters can comprise one or more voltage parameters and/or one or more impedance parameters. The control arrangement 20 or a corresponding entity can comprise or can be connected to a suitable measuring arrangement (not shown) which can measure voltage and/or impedance values possibly needed in the various embodiments. Examples of such voltage and impedance values include a voltage $U_{DC}$ between the positive direct current pole $U_{DC,P}$ and the negative direct current pole $U_{DC,N}$, and an impedance $Z_{DC}$ between the positive direct current pole $U_{DC,P}$ or negative direct current pole $U_{DC,N}$ and the earth potential of the alternating current network supplied by the inverter.

According to an exemplary embodiment, the controllable switch $S_X$ is controlled to be non-conductive (OFF state) when the voltage $U_{DC}$ between the positive direct current pole $U_{DC,P}$ and the negative direct current pole $U_{DC,N}$ is lower than a predetermined threshold, and the controllable switch $S_X$ is controlled to be conductive (ON state) when the voltage $U_{DC}$ between the positive direct current pole $U_{DC,P}$ and the negative direct current pole $U_{DC,N}$ is higher than the predetermined threshold. The value of the voltage $U_{DC}$ used in the control can be a reference value of the voltage $U_{DC}$ or a measured value of the voltage $U_{DC}$. According to an embodiment described herein, the predetermined voltage threshold can be:

$$U_g\sqrt{6}+U_{margin}+U_{add}$$

where
$U_g$=phase voltage of the alternating current network supplied by the inverter;
$U_{margin}$=voltage value depending on the system control and component values; and
$U_{add}$=additional voltage depending on the system control and modulation methods and component values.

According to an exemplary embodiment of the present disclosure, the controllable switch $S_X$ is controlled to be non-conductive when the impedance $Z_{DC}$ between the positive direct current pole $U_{DC,P}$ or negative direct current pole $U_{DC,N}$ and the earth potential of the alternating current network supplied by the inverter is higher than a predetermined threshold, and the controllable switch $S_X$ is controlled to be conductive when the impedance $Z_{DC}$ between the positive $U_{DC,P}$ or negative direct current pole $U_{DC,N}$ and the earth potential of the alternating current network supplied by the inverter is lower than the predetermined threshold. According to an embodiment described herein, the predetermined impedance threshold can correspond to a value for the impedance $Z_{DC}$ that is high enough for a high-frequency leakage current not to flow to a harmful degree.

It is also possible to combine the voltage-based and impedance-based controls described above and use them simultaneously. In such a case, the impedance condition can be given priority.

Figure 5:
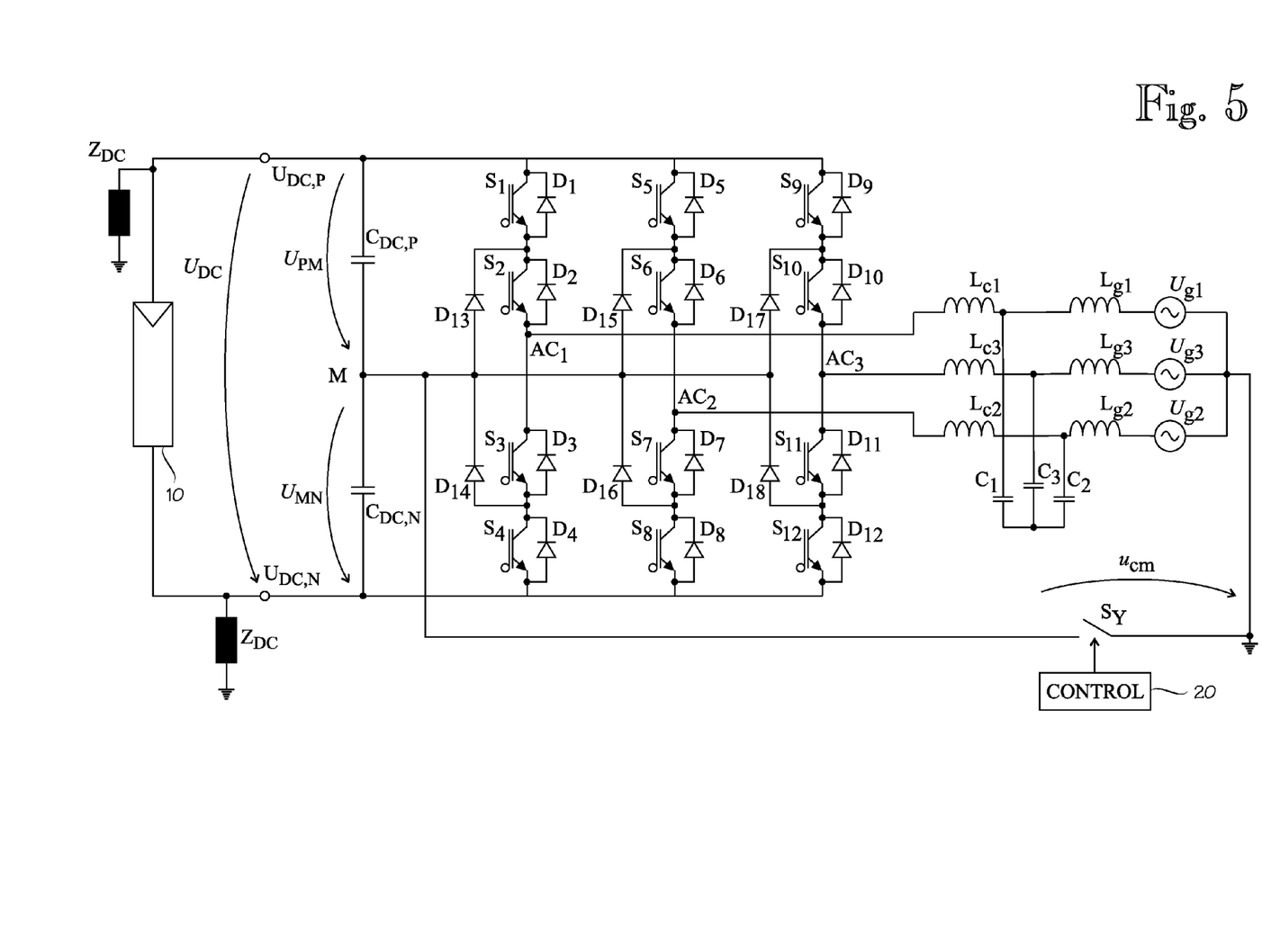
FIG. 5 shows a circuit diagram of a fifth three-phase three-level inverter according to an exemplary embodiment of the present disclosure.

FIG. 5 shows a circuit diagram of a fifth three-phase three-level inverter according to an exemplary embodiment of the present disclosure. According to an exemplary embodiment of present disclosure, as shown in FIG. 5, there is a controllable switch $S_Y$ connected between the neutral direct current pole M of the inverter and the earth potential of the alternating current network supplied by the inverter. The controllable switch $S_Y$ can be part of the inverter or part of a separate switching arrangement, for example. The controllable switch $S_Y$ can be an electromechanical switch, such as a relay or a contactor, or a semiconductor switch, for example. The controllable switch $S_Y$ can also be a manually controllable mechanical switch.

According to an exemplary embodiment described herein, the switch $S_Y$ is controlled according to one or more predetermined parameters. This can be performed manually by an operator of the inverter system. Such a manual control of the switch $S_Y$ can take place at any time. The switch $S_Y$ can be set at the start-up of the inverter system or later according to the one or more predetermined parameters, such as system conditions, and the setting can be changed if necessary. The control of the switch $S_Y$ can also be performed automatically. For this, a control arrangement 20 can be provided which is configured to control the switch $S_Y$ according to the one or more predetermined parameters. Also the control arrangement 20 or a corresponding entity can be part of the inverter or part of a separate switching arrangement, for example. According to an exemplary embodiment, the one or more predetermined parameters can comprise one or more voltage parameters and/or one or more impedance parameters.

According to an exemplary embodiment of the present disclosure, the controllable switch $S_Y$ is controlled to be non-conductive (OFF state) when the voltage $U_{DC}$ between the positive direct current pole $U_{DC,P}$ and the negative direct current pole $U_{DC,N}$ is lower than a predetermined threshold, and the controllable switch $S_Y$ is controlled to be conductive (ON state) when the voltage $U_{DC}$ between the positive direct current pole $U_{DC,P}$ and the negative direct current pole $U_{DC,N}$ is higher than the predetermined threshold. The value of the voltage $U_{DC}$ used in the control can be a reference value of the voltage $U_{DC}$ or a measured value of the voltage $U_{DC}$. According to an exemplary embodiment, the predetermined voltage threshold can be:

$$U_g\sqrt{8}+U_{margin}$$

According to another exemplary embodiment, the controllable switch $S_Y$ is controlled to be non-conductive when the impedance $Z_{DC}$ between the positive direct current pole $U_{DC,P}$ or negative direct current pole $U_{DC,N}$ and the earth potential of the alternating current network supplied by the inverter is higher than a predetermined threshold, and the controllable switch $S_Y$ is controlled to be conductive when the impedance $Z_{DC}$ between the positive $U_{DC,P}$ or negative direct current pole $U_{DC,N}$ and the earth potential of the alternating current network supplied by the inverter is lower than the predetermined threshold. The predetermined impedance threshold can correspond to a value for the impedance $Z_{DC}$ that is high enough for a low-frequency leakage current not to flow to a harmful degree.

It is also possible to combine the voltage-based and impedance-based controls described above and use them simultaneously. In such a case, the impedance condition can be given a priority.

Figure 6:
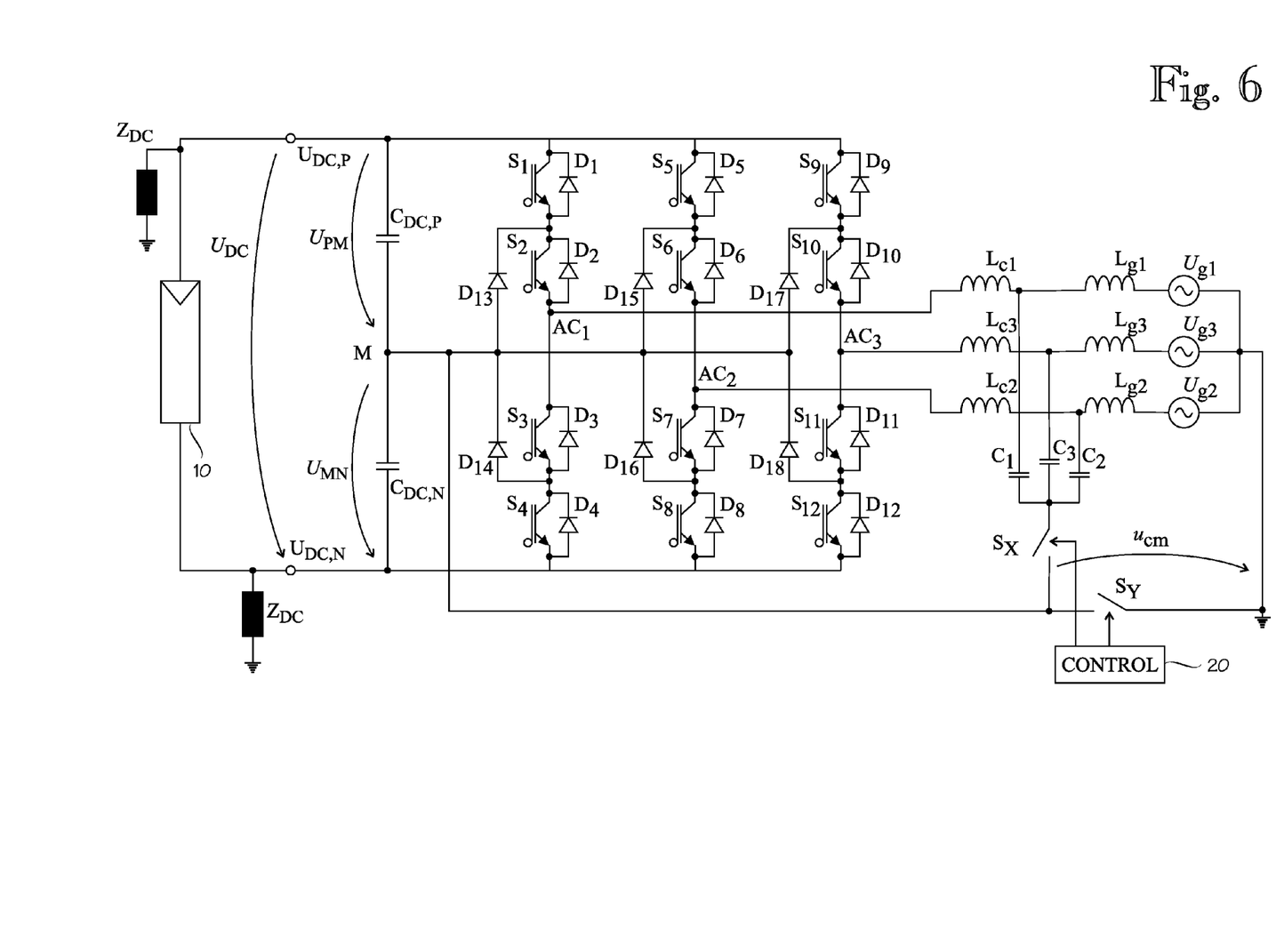
FIG. 6 shows a circuit diagram of a sixth three-phase three-level inverter according to an embodiment.

FIG. 6 shows a circuit diagram of a sixth three-phase three-level inverter according to an embodiment. According to an exemplary embodiment, as shown in FIG. 6, there is a first controllable switch $S_X$ connected between the neutral direct current pole M of the inverter and a virtual neutral point of an alternating current network supplied by the inverter and a second controllable switch $S_Y$ connected between the neutral direct current pole M of the inverter and the earth potential of the alternating current network supplied by the inverter. Further, according to an exemplary embodiment, the first switch $S_X$ and the second switch $S_Y$ can be controlled according to one or more predetermined parameters. This can be implemented with a control arrangement 20 which is configured to control the switches according to the one or more predetermined parameters. According to another exemplary embodiment, the one or more predetermined parameters can include one or more voltage parameters and/or one or more impedance parameters.

According to an exemplary embodiment of the present disclosure, the first controllable switch $S_X$ is controlled to be non-conductive when the voltage $U_{DC}$ between the positive direct current pole $U_{DC,P}$ and the negative direct current pole $U_{DC,N}$ is lower than a first predetermined threshold or higher than a second predetermined threshold, and the first controllable switch $S_X$ is controlled to be conductive when the voltage $U_{DC}$ between the positive direct current pole $U_{DC,P}$ and the negative direct current pole $U_{DC,N}$ is higher than the first predetermined threshold and lower than the second predetermined threshold. In addition, the second controllable switch $S_Y$ is controlled to be non-conductive when the voltage $U_{DC}$ between the positive direct current pole $U_{DC,P}$ and the negative direct current pole $U_{DC,N}$ is lower than the second predetermined threshold, and the second controllable switch $S_Y$ is controlled to be conductive when the voltage $U_{DC}$ between the positive direct current pole $U_{DC,P}$ and the negative direct current pole $U_{DC,N}$ is higher than the second predetermined threshold. The value of the voltage $U_{DC}$ used in the control can be a reference value of the voltage $U_{DC}$ or a measured value of the voltage $U_{DC}$.

According to an exemplary embodiment described herein, the first predetermined voltage threshold can be:

$$U_{limit,1}=U_g\sqrt{6}+U_{margin}+U_{add}$$

and the second predetermined voltage threshold can be:

$$U_{limit,2}=U_g\sqrt{8}+U_{margin}$$

As noted already above in connection with other embodiments, the values of $U_{margin}$ and $U_{add}$ depend on system properties. According to an embodiment, $U_{add} \approx (U_{limit,2}-U_{limit,1})/2$. Table 1 below shows the conditions of control according to an embodiment:

| State | $S_x$ | $S_y$ | Basic Condition |
|---|---|---|---|
| $\underline{S}_x\underline{S}_y$ | Off | Off | $U_{DC} < U_{limit,1}$ |
| $S_x\underline{S}_y$ | On | Off | $U_{limit,1} \leq U_{DC} < U_{limit,2}$ |
| $\underline{S}_xS_y$ | Off | On | $U_{DC} \geq U_{limit,2}$ |
| $S_xS_y$ | On | On | Never permitted |

When transiting from state $SxSy$ to state $\underline{S}x\underline{S}y$ or from state $\underline{S}xSy$ to state $Sx\underline{S}y$, it is preferable to proceed via state $\underline{S}xSy$ as state $SxSy$ is preferably avoided.

According to an embodiment of the present disclosure, the first controllable switch $S_X$ is controlled to be non-conductive when the impedance $Z_{DC}$ between the positive direct current pole $U_{DC,P}$ or negative direct current pole $U_{DC,N}$ and the earth potential of the alternating current network supplied by the inverter is higher than a first predetermined threshold or lower than a second predetermined threshold, and the first controllable switch $S_X$ is controlled to be conductive when the impedance $Z_{DC}$ between the positive $U_{DC,P}$ or negative direct current pole $U_{DC,N}$ and the earth potential of the alternating current network supplied by the inverter is lower than the first predetermined threshold and higher than the second predetermined threshold. In addition, the second controllable switch $S_Y$ is controlled to be non-conductive when the impedance $Z_{DC}$ between the positive direct current pole $U_{DC,P}$ or negative direct current pole $U_{DC,N}$ and the earth potential of the alternating current network supplied by the inverter is higher than the second predetermined threshold, and the controllable switch $S_Y$ is controlled to be conductive when the impedance $Z_{DC}$ between the positive $U_{DC,P}$ or negative direct current pole $U_{DC,N}$ and the earth potential of the alternating current network supplied by the inverter is lower than the second predetermined threshold.

According to another exemplary embodiment, the first predetermined impedance threshold $Z_{limit,1}$ can correspond to a value for the impedance $Z_{DC}$ that is high enough for a high-frequency leakage current not to flow to a harmful degree. According to an exemplary embodiment, the second predetermined impedance threshold $Z_{limit,2}$ can correspond to a value for the impedance $Z_{DC}$ that is high enough for a low-frequency leakage current not to flow to a harmful degree. In addition, $Z_{limit,1} > Z_{limit,2}$.

Table 2 below shows the conditions of control according to an embodiment:

| State | $S_x$ | $S_y$ | Basic Condition |
|---|---|---|---|
| $\underline{S}_x\underline{S}_y$ | Off | Off | $Z_{DC} > Z_{limit,1}$ |
| $S_x\underline{S}_y$ | On | Off | $Z_{limit,2} \leq Z_{DC} \leq Z_{limit,1}$ |
| $\underline{S}_xS_y$ | Off | On | $Z_{DC} < Z_{limit,2}$ |
| $S_xS_y$ | On | On | Never permitted |

When transiting from state $Sx\underline{S}y$ to state $\underline{S}x\underline{S}y$ or from state $\underline{S}xSy$ to state $Sx\underline{S}y$, it is preferable to proceed via state $\underline{S}xSy$ as state $SxSy$ is preferably avoided.

It is also possible to combine the voltage-based and impedance-based controls described above and use them simultaneously. In such a case, the impedance condition can be given a priority.

According to an exemplary embodiment described herein, the first controllable switch $S_X$ and/or the second controllable switch $S_Y$ in the above embodiments can, alternatively or in addition, be controlled according to an output current of the inverter (or an output power of the inverter). For example, the first controllable switch $S_X$ and/or the second controllable switch $S_Y$ can be controlled such that the output current of the inverter is maximized and common-mode voltages can be mitigated when the conditions allow. The conditions and thresholds possibly used in connection with this embodiment depend on the particular system.

The control of the controllable switch(es) $S_X$, $S_Y$ according to the various embodiments described above can be performed manually or by or via the control arrangement 20, which can also perform the normal modulation control of the semiconductor switches of the inverter. It is also possible to use additional or separate logical or physical units (not shown) for performing the control functionality of the disclosure. The functionality of the disclosure could, for example, be implemented using a separate logic arrangement, which could be independent of the normal modulation control of the semiconductor switches of the inverter, for example.

The control arrangement 20 and/or a separate logic arrangement controlling the controllable semiconductor switches according to any one of the above embodiments, or a combination thereof, can be implemented as one unit or as two or more separate units that can be configured to implement the functionality of the various embodiments. Here the term 'unit' refers generally to a physical or logical entity, such as a physical device or a part thereof or a software routine. The control arrangement 20 according to any one of the embodiments can be implemented at least partly by means of one or more computers or corresponding digital signal processing (DSP) equipment provided with suitable software, for example. Such a computer or digital signal processing equipment preferably comprises at least a working memory (RAM) providing storage area for arithmetical operations, and a central processing unit (CPU), such as a general-purpose digital signal processor.

The CPU can include a set of registers, an arithmetic logic unit, and a CPU control unit. The CPU control unit is controlled by a sequence of program instructions transferred to the CPU from the RAM. The CPU control unit can contain a number of microinstructions for basic operations. The implementation of microinstructions can vary depending on the CPU design. The program instructions can be coded by a programming language, which can be a high-level programming language, such as C, Java, etc., or a low-level programming language, such as a machine language, or an assembler. The computer can also have an operating system which can provide system services to a computer program written with the program instructions. The computer or other apparatus implementing the disclosure, or a part thereof, can further include suitable input means for receiving e.g., measurement and/or control data, and output means for outputting e.g. control data. It is also possible to use analog circuits, programmable logic devices (PLD), such as a field-programmable gate array (FPGA), or discrete electric components and devices for implementing the functionality according to any one of the embodiments. For example, the control arrangement 20 according to any one of the embodiments can be implemented at least partly by means of such analog circuits or programmable logic devices.

The disclosure can be implemented in existing system elements or by using separate dedicated elements or devices in a centralized or distributed manner. Present inverters, for example, can include programmable logic devices or processors and memory that can be utilized in the functions according to embodiments of the disclosure. Thus, all modifications and configurations required for implementing an embodiment of the disclosure e.g., in existing inverters can be performed as software routines, which can be implemented as added or updated software routines. If at least part of the functionality of the disclosure is implemented by software, such software can be provided as a computer program product including computer program code which, when run on a computer, causes the computer or a corresponding arrangement to perform the functionality according to the disclosure as described above. Such a computer program code can be stored or generally embodied on a computer readable medium, such as a suitable memory, e.g., a flash memory or an optical memory, from which it is loadable to the unit or units executing the program code. In addition, such a computer program code implementing the disclosure can be loaded to the unit or units executing the computer program code via a suitable data network, for example, and it can replace or update a possibly existing program code.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A switching arrangement for an inverter, the inverter including a positive direct current pole, a negative direct current pole, and a neutral direct current pole, the arrangement comprising:

at least one of:
a) a first controllable switch connected between the neutral direct current pole of the inverter and a virtual neutral point of an alternating current network supplied by the inverter, wherein the arrangement includes means for controlling the first controllable switch configured to control the first controllable switch according to one or more predetermined parameters including at least one of one or more voltage parameters, one or more impedance parameters, one or more current parameters, and one or more power parameters; and
b) a second controllable switch connected between the neutral direct current pole of the inverter and an earth potential of an alternating current network supplied by the inverter, wherein the arrangement includes means for controlling the second controllable switch configured to control the second controllable switch according to one or more predetermined parameters including at least one of one or more voltage parameters, one or more impedance parameters, one or more current parameters, and one or more power parameters, wherein:
when the arrangement includes only the first controllable switch, the means for controlling the first controllable switch are configured to:
control the first controllable switch to be non-conductive when a voltage between the positive direct current pole and the negative direct current pole is lower than a predetermined threshold; and
control the first controllable switch to be conductive when the voltage between the positive direct current pole and the negative direct current pole is higher than the predetermined threshold, or
when the arrangement includes only the second controllable switch, the means for controlling the second controllable switch are configured to:
control the second controllable switch to be non-conductive when a voltage between the positive direct current pole and the negative direct current pole is lower than a predetermined threshold; and
control the second controllable switch to be conductive when the voltage between the positive direct current pole and the negative direct current pole is higher than the predetermined threshold, or when the arrangement includes both the first controllable switch and the second controllable switch, the means for controlling the first controllable switch are configured to:
control the first controllable switch to be non-conductive when a voltage between the positive direct current pole and the negative direct current pole is lower than a first predetermined threshold or higher than a second predetermined threshold; and
control the first controllable switch to be conductive when the voltage between the positive direct current pole and the negative direct current pole is higher than the first predetermined threshold and lower than the second predetermined threshold; and the means for controlling the second controllable switch are configured to:
control the second controllable switch to be non-conductive when the voltage between the positive direct current pole and the negative direct current pole is lower than the second predetermined threshold; and
control the second controllable switch to be conductive when the voltage between the positive direct current pole and the negative direct current pole is higher than the second predetermined threshold, or when the arrangement includes only the first controllable switch, the means for controlling the first controllable switch are configured to:
control the first controllable switch to be non-conductive when an impedance between the positive or negative direct current pole and the earth potential of the alternating current network supplied by the inverter is higher than a predetermined threshold; and
control the first controllable switch to be conductive when the impedance between the positive or negative direct current pole and the earth potential of the alternating current network supplied by the inverter is lower than the predetermined threshold, or when the arrangement includes only the second controllable switch, the means for controlling the second controllable switch are configured to:
control the second controllable switch to be non-conductive when an impedance between the positive or negative direct current pole and the earth potential of the alternating current network supplied by the inverter is higher than a predetermined threshold; and
control the second controllable switch to be conductive when the impedance between the positive or negative direct current pole and the earth potential of the alternating current network supplied by the inverter is lower than the predetermined threshold or when the arrangement includes both the first controllable switch and the second controllable switch,
the means for controlling the first controllable switch are configured to:
control the first controllable switch to be non-conductive when an impedance between the positive or negative direct current pole and the earth potential of the alternating current network supplied by the inverter is higher than a first predetermined threshold or lower than a second predetermined threshold; and
control the first controllable switch to be conductive when the impedance between the positive or negative direct current pole and the earth potential of the alternating current network supplied by the inverter is lower than the first predetermined threshold and higher than the second predetermined threshold; and the means for controlling the second controllable switch are configured to:
control the second controllable switch to be non-conductive when the impedance between the positive or negative direct current pole and the earth potential of the alternating current network supplied by the inverter is higher than the second predetermined threshold; and
control the second controllable switch to be conductive when the impedance between the positive or negative direct current pole and the earth potential of the alternating current network supplied by the inverter is lower than the second predetermined threshold.

2. The arrangement of claim 1, wherein, for the first controllable switch, the virtual neutral point of the alternating current network supplied by the inverter is a star point of three star-connected impedances in the alternating current network.

3. An inverter comprising:
a positive direct current pole, a negative direct current pole, a neutral direct current pole, and an arrangement according to claim 1.

4. The inverter of claim 3, wherein the inverter is a three-phase three-level inverter comprising three switching branches, wherein each switching branch includes four controllable semiconductor switches connected in series between the positive direct current pole and the negative direct current pole.

5. The inverter of claim 4, wherein the inverter is a neutral-point-clamped inverter or an active neutral-point-clamped inverter.

6. A method for controlling an inverter including a positive direct current pole, a negative direct current pole, and a neutral direct current pole, wherein the inverter comprises at least one of a) a first controllable switch connected between the neutral direct current pole of the inverter and a virtual neutral point of an alternating current network supplied by the inverter, and b) a second controllable switch connected between the neutral direct current pole of the inverter and an earth potential of an alternating current network supplied by the inverter, the method comprising:
at least one of:
controlling the first controllable switch according to one or more predetermined parameters including at least one of one or more voltage parameters, one or more impedance parameters, one or more current parameters, and one or more power parameters; and
controlling the second controllable switch according to one or more predetermined parameters including at least one of one or more voltage parameters, one or more impedance parameters, one or more current parameters, and one or more power parameters, wherein:
when the arrangement includes only the first controllable switch, the method comprises:
controlling the first controllable switch to be non-conductive when a voltage between the positive direct current pole and the negative direct current pole is lower than a predetermined threshold; and
controlling the first controllable switch to be conductive when the voltage between the positive direct current pole and the negative direct current pole is higher than the predetermined threshold; or
when the arrangement includes only the second controllable switch, the method comprises:
controlling the second controllable switch to be non-conductive when a voltage between the positive direct current pole and the negative direct current pole is lower than a predetermined threshold; and
controlling the second controllable switch to be conductive when the voltage between the positive direct current pole and the negative direct current pole is higher than the predetermined threshold; or
when the arrangement includes both the first controllable switch and the second controllable switch, the method comprises:
controlling the first controllable switch to be non-conductive when a voltage between the positive direct current pole and the negative direct current pole is lower than a first predetermined threshold or higher than a second predetermined threshold;
controlling the first controllable switch to be conductive when the voltage between the positive direct current pole and the negative direct current pole is higher than the first predetermined threshold and lower than the second predetermined threshold;
controlling the second controllable switch to be non-conductive when the voltage between the positive direct current pole and the negative direct current pole is lower than the second predetermined threshold; and
controlling the second controllable switch to be conductive when the voltage between the positive direct current pole and the negative direct current pole is higher than the second predetermined threshold; or
when the arrangement includes only the first controllable switch, the method comprises:
controlling the first controllable switch to be non-conductive when an impedance between the positive or negative direct current pole and the earth potential of the alternating current network supplied by the inverter is higher than a predetermined threshold; and
controlling the first controllable switch to be conductive when the impedance between the positive or negative direct current pole and the earth potential of the alternating current network supplied by the inverter is lower than the predetermined threshold; or when the arrangement includes only the second controllable switch, the method comprises:
controlling the second controllable switch to be non-conductive when an impedance between the positive or negative direct current pole and the earth potential of the alternating current network supplied by the inverter is higher than a predetermined threshold; and
controlling the second controllable switch to be conductive when the impedance between the positive or negative direct current pole and the earth potential of the alternating current network supplied by the inverter is lower than the predetermined threshold; or
when the arrangement includes both the first controllable switch and the second controllable switch, the method comprises:
controlling the first controllable switch to be non-conductive when an impedance between the positive or negative direct current pole and the earth potential of the alternating current network supplied by the inverter is higher than a first predetermined threshold or lower than a second predetermined threshold;
controlling the first controllable switch to be conductive when the impedance between the positive or negative direct current pole and the earth potential of the alternating current network supplied by the inverter is lower than the first predetermined threshold and higher than the second predetermined threshold;
controlling the second controllable switch to be non-conductive when the impedance between the positive or negative direct current pole and the earth potential of the alternating current network supplied by the inverter is higher than the second predetermined threshold; and
controlling the second controllable switch to be conductive when the impedance between the positive or negative direct current pole and the earth potential of the alternating current network supplied by the inverter is lower than the second predetermined threshold.

7. A computer program product comprising:
computer program code embodied on a non-transitory computer readable medium, wherein execution of the program code on a computer causes the computer to carry out the steps of the method according to claim 6.

* * * * *